United States Patent
Kastner et al.

(10) Patent No.: US 12,077,033 B2
(45) Date of Patent: Sep. 3, 2024

(54) AIR CIRCULATION SYSTEM FOR A VEHICLE

(71) Applicant: DENSO International America, Inc., Southfield, MI (US)

(72) Inventors: Mark Kastner, Livonia, MI (US); Matthew Filipkowski, Lake Orion, MI (US); Yuanpei Song, Southfield, MI (US); Mika Gocho, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 95 days.

(21) Appl. No.: 17/740,758

(22) Filed: May 10, 2022

(65) Prior Publication Data
US 2022/0363108 A1    Nov. 17, 2022

Related U.S. Application Data

(60) Provisional application No. 63/186,833, filed on May 11, 2021.

(51) Int. Cl.
*B60H 1/24* (2006.01)
*B60H 1/34* (2006.01)

(52) U.S. Cl.
CPC ........... *B60H 1/243* (2013.01); *B60H 1/3407* (2013.01)

(58) Field of Classification Search
CPC .............................. B60H 1/243; B60H 1/3407
See application file for complete search history.

(56) References Cited

U.S. PATENT DOCUMENTS

2008/0202566 A1* 8/2008 Gonska ................. A47L 15/488
134/115 R

FOREIGN PATENT DOCUMENTS

| DE | 2750671 A | * | 5/1979 | ......... B60H 1/00471 |
| EP | 1333996 B1 | | 8/2007 | |
| EP | 10029740 B4 | | 1/2010 | |
| EP | 1205321 B2 | | 4/2015 | |
| JP | 2014139066 A | * | 7/2014 | ............. B60H 1/245 |

OTHER PUBLICATIONS

Translation, JP-2014139066-A (Year: 2014).*
Translation, DE-2750671-A (Year: 1979).*

* cited by examiner

*Primary Examiner* — Jessica Yuen
(74) *Attorney, Agent, or Firm* — Dickinson Wright PLLC

(57) ABSTRACT

An air circulation system configured to mount within a B-pillar, C-pillar, other pillar, or interior trim or cross trims through an air channel of a vehicle. The air circulation system includes a scroll within the pillar, which defines an inlet configured to receive inlet air from a vehicle cabin at the pillar. A fan within the pillar is configured to circulate the inlet air within the scroll. An elongated throat extending from the scroll is configured to receive forced air from the scroll. The throat defines a length and an outlet extending along the length, wherein the outlet delivers the forced air into the vehicle cabin from the pillar in an air stream. The outlet is configured such that the forced air delivered from the outlet creates a Coandă effect that attracts air in the vehicle cabin to move in the direction of the air stream.

14 Claims, 7 Drawing Sheets

AIR CIRCULATION SYSTEM FOR A VEHICLE

CROSS-REFERENCE TO RELATED APPLICATION

This application claims the benefit and priority of U.S. Provisional Application No. 63/186,833 filed May 11, 2021, the disclosure of which is incorporated by reference herein.

TECHNICAL FIELD

This disclosure relates to an air circulation system for a vehicle.

BACKGROUND

The statements in this section merely provide background information related to the present disclosure and may not constitute prior art.

Automotive vehicles typically include a heating, ventilation, and air conditioning (HVAC) unit that may be coupled to a vehicle dashboard and that provides conditioned air (e.g., heated and/or cooled and/or dehumidified or humidified and/or filtered) to a vehicle occupant cabin via one or more duct lines. Valves, louvers, doors and the like can be operated to direct the conditioned air to the vehicle occupants. For example, a vehicle occupant can operate a louver on the dashboard to direct the conditioned air exiting the HVAC unit to the occupant's face.

Vehicles may also have HVAC systems for providing conditioned air to the second row or rear row of seating. Small outlets within the vehicle HVAC system may be provided near the second row, for example, at the rear of the center console or beneath the front seats.

SUMMARY

According to an embodiment, an air circulation system configured to mount within a B-pillar, C-pillar, or other pillar of a vehicle is provided. The air circulation system includes a scroll within the pillar, which defines an inlet configured to receive inlet air from a vehicle cabin at the pillar. A fan within the pillar is configured to circulate the inlet air within the scroll. An elongated throat extending from the scroll is configured to receive forced air from the scroll. The throat defines a length and an outlet extending along the length, wherein the outlet delivers the forced air into the vehicle cabin from the pillar in an air stream. The outlet is configured such that the forced air delivered from the outlet creates a Coandă effect that attracts air in the vehicle cabin to move in the direction of the air stream According to another embodiment, an air circulation system for a vehicle includes a scroll having an inlet that receives air from a pillar of a vehicle. A fan within the scroll is configured to circulate the air within the scroll. An elongated throat extending from the scroll is configured to receive the air via the fan, wherein the throat defines a length and an outlet extending along the length, wherein the outlet is configured to deliver forced air from the throat to a cabin of the vehicle at the pillar in an air stream, wherein the throat defines a plurality of interior surfaces defining an air channel for delivering the forced air to the cabin. A plurality of veins extend inwardly from one of the interior surfaces, wherein the veins are configured to homogenize the air flow in the air channel. The outlet is configured such that the forced air delivered from the outlet creates a Coandă effect that attracts air in the cabin of the vehicle to move in the direction of the air stream.

According to another embodiment, a method for delivering air to a vehicle cabin includes: receiving air from an inlet located at a B-pillar of the vehicle; circulating the air within a scroll in the B-pillar; forcing the air from the scroll up into a throat connected to the scroll, wherein the throat defines a length and an outlet extending along the length; at the B-pillar, delivering the forced air into the vehicle cabin via an air stream created at the outlet, wherein the outlet creates a Coandă that draws cabin air to move in a direction of the air stream; and directing the air stream via a deflector pivotally attached to the throat.

DETAILED DESCRIPTION

Figure 1:
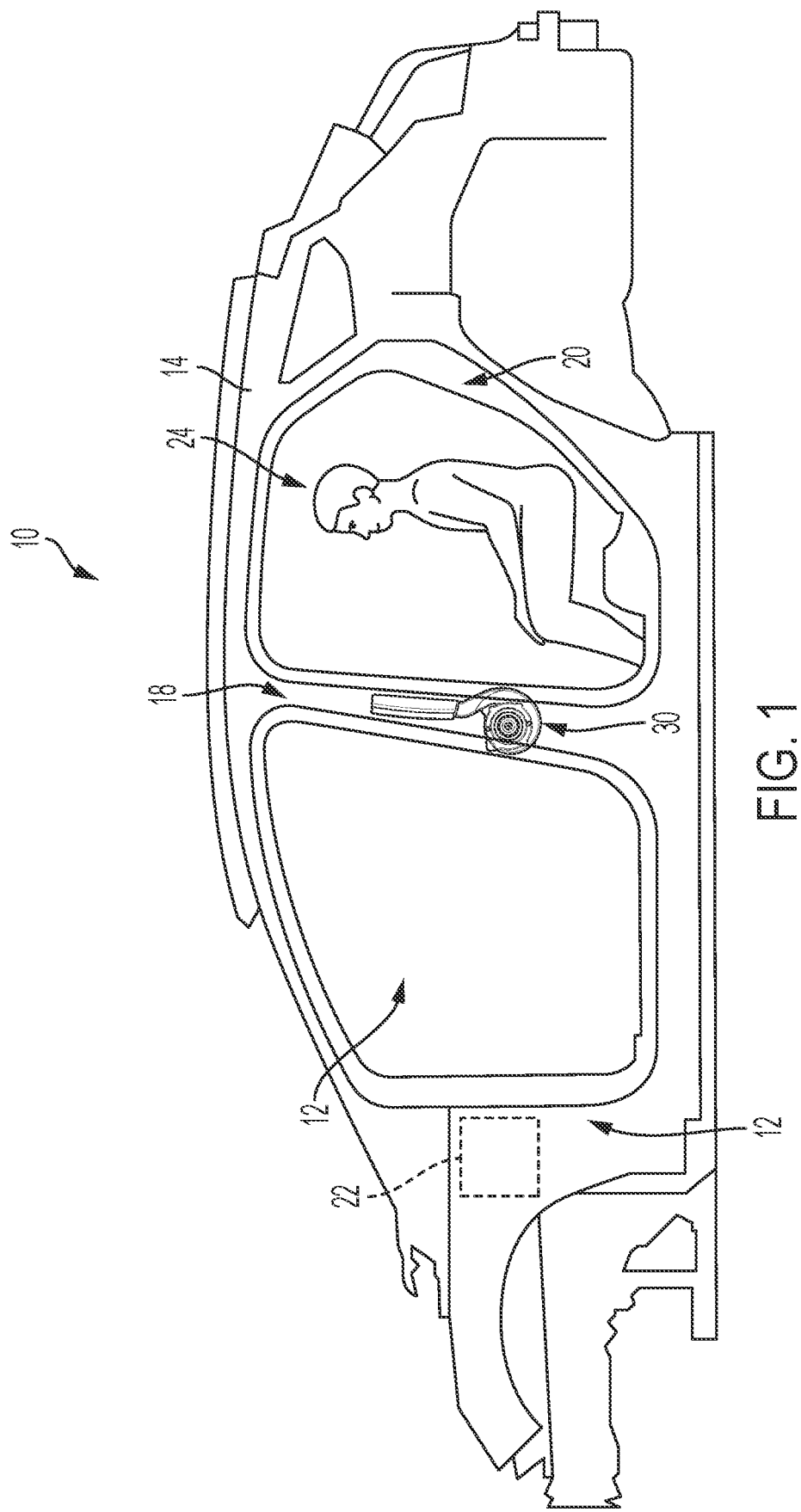
FIG. 1 illustrates a side view of a vehicle with an air circulation system installed therein, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles typically include a heating, ventilation, and air conditioning (HVAC) unit that may be coupled to a vehicle dashboard and that provides conditioned air (e.g., heated and/or cooled and/or dehumidified or humidified and/or filtered) to a vehicle occupant cabin via one or more duct lines. Valves, louvers, doors and the like can be operated to direct the conditioned air to the vehicle occupants. For example, a vehicle occupant can operate a louver on the dashboard to direct the conditioned air exiting the HVAC unit to the occupant's face or feet, and/or toward the vehicle's windshield.

In order to get conditioned air to the second (or third, fourth, or rear) row of a vehicle, vehicle air conditioning systems typically include outlets behind the center console, under the front seats, or in the roof of the vehicle. However, heating and cooling performance is often significantly worse in the second row than in the first row. One reason for this is due to the HVAC unit's proximity to the front row of seating; undesirable heat exchange can occur as the air travels from the HVAC unit to the outlets for delivering the conditioned air to the passengers in the second row. Another reason for this is the distance the occupants are from the air outlets. Yet another reasons for this is the amount of air flow that can be achieved at the outlets; the pressure drop through the ducts can reduce the air flow.

Therefore, according to various embodiments disclosed herein, an air circulation system for a vehicle is disclosed for improving the quality of conditioned air flow to the second (or rear) row of seats within the vehicle. In embodiments, the air circulation system may be installed within a B-pillar of the vehicle, located rearward of the first row of passengers in the vehicle and forward of the second row of passengers. The air circulation system can be designed to deliver high-velocity air out of its outlet in the B-pillar, which creates a low pressure point along the outlet, causing (via the Venturi effect) to pull air from the front of the vehicle cabin toward the rear of the vehicle cabin.

While embodiments described herein relate to the air circulation system being installed in the B-pillar, it should also be understood that the air circulation system can be installed in the C-pillar to improve the quality of air flow to a third row of seating. Also, this disclosure refers to the air circulation system being installed within the pillar; it should be understood that the location of the air circulation system may be between the structural frame of the pillar and the trim that faces the vehicle cabin. In other words, the air circulation system need not be installed within the actual structural frame of the vehicle. Instead, references to the air circulation system being installed in the pillar can be construed to mean just beneath the trim of the vehicle, but outside of the structural (e.g., metal) tubular frame that is a skeleton of the pillar. For example, references to the "B-pillar" can be construed to include the vehicle's frame that structurally supports the pillar, and the body and trim that surrounds the structural pillar at a location between the front row of seats and the second row of seats. In short, references to a "pillar" can include the body and trim immediately surrounding the structural pillar itself.

Turning now to the Figures, FIG. 1 shows a portion of a vehicle 10 having an interior, also referred to as a cabin 12. The vehicle 10 may be an automotive vehicle, such as a car, van, truck, sports utility vehicle (SUV), or any other type of passenger vehicle. The portion of the vehicle 10 illustrated in FIG. 1 is a part of a vehicle frame 14 that structurally supports the vehicle. The frame 14 may include several pillars, such as an A-pillar 16, B-pillar 18, and C-pillar 20. The vehicle 10 illustrated in FIG. 1 is a sedan-style vehicle that only includes A-, B-, and C-pillars; in other non-illustrated embodiments, the vehicle is a larger vehicle (e.g., van or SUV) with a D-pillar. The A-pillar 16 is forward of the front row of seats and provides support for, among other things, a front dash that typically houses an HVAC unit for conditioning the air in the cabin 12. A location of an HVAC unit is shown generally at 22, and can comprise various heat exchange devices and fans for heating or cooling the air within the cabin 12.

Figure 2:
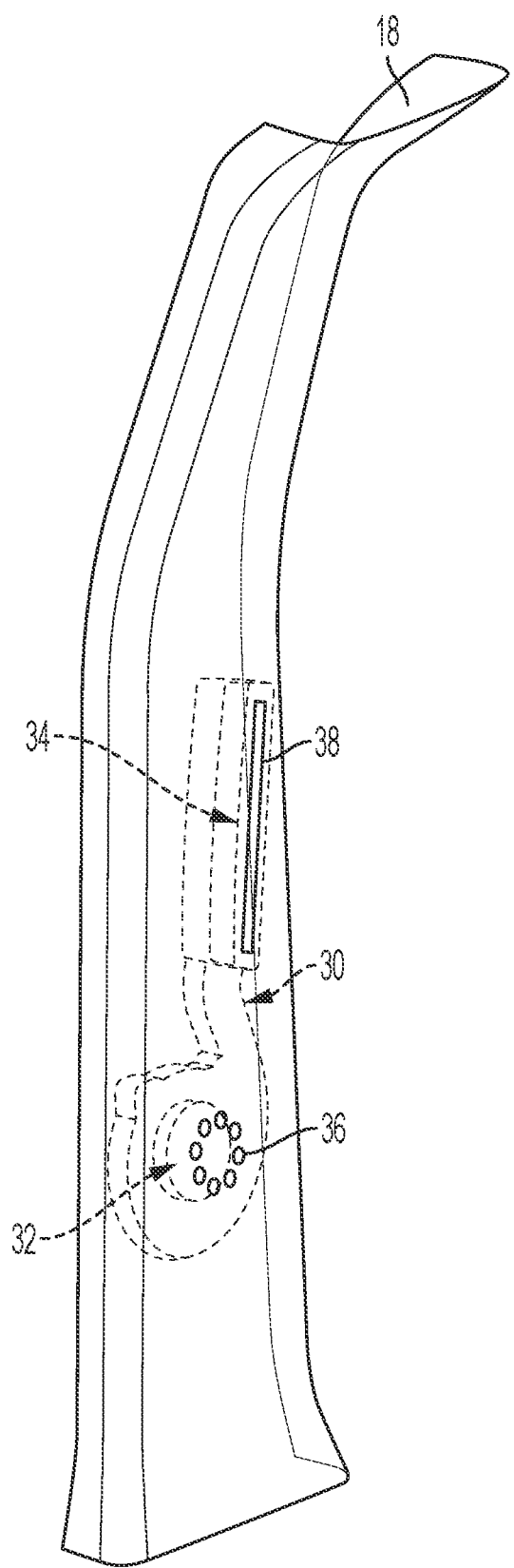
FIG. 2 illustrates a perspective view of a pillar (e.g., B-pillar) of a vehicle with an installed air circulation system, according to an embodiment.

However, the conditioned air may not reach a rear occupant (shown generally at 24) sitting in the second row of seats for at least the reasons provided above. To better deliver conditioned air to the rear occupant 24, an air circulation system 30 is disclosed according to embodiments herein. Referring to FIGS. 1-2, the air circulation system 30 may be installed or otherwise located within the B-pillar 18 of the vehicle, for example. Such a pillar may be hollow with an interior volume suitable to house the air circulation system 30. The air circulation system 30 has an inlet 32 and an outlet 34. The air circulation system 30 can be completely disconnected or otherwise disassociated with the main vehicle HVAC system (e.g., HVAC unit 22) such that it does not include a heat source or cooling source acting directly on the air transferred within the air circulation system 30. The air chambers within the circulation system 30 are not fluidly connected to any air chambers of the main HVAC system of the vehicle; the air circulation system 30 receives air from the vehicle's cabin 12 via the inlet 32, and forces air back into the vehicle cabin 12 via the outlet 34.

To allow for the flow of air into the inlet 32 and out of the outlet 34, the B-pillar 18 may have a plurality of aligned openings. For example, the B-pillar 18 (specifically, the interior-most region of the pillar visible to vehicle occupants) may have openings 36 aligned with the inlet 32 of the air circulation system 30, and openings 38 aligned with the outlet 34 of the air circulation system 30. The openings 36 may include a plurality of small (e.g., less than 0.5 inches in diameter) apertures. The apertures may be circular, rectangular, or any other suitable shape which can be altered to not only match aesthetic demands, but also control the air flow into the inlet 32. On the other hand, the openings 38 include one or more elongated slots or slits, which are sized to enable a desired stream of air that will be further described herein. In one embodiment, the openings 38 may each have a length that exceeds a width by more than 10 times. In a particular embodiment, the openings 38 are slots having a length exceeding 5 inches and a width less than 0.5 inches.

Figure 3:
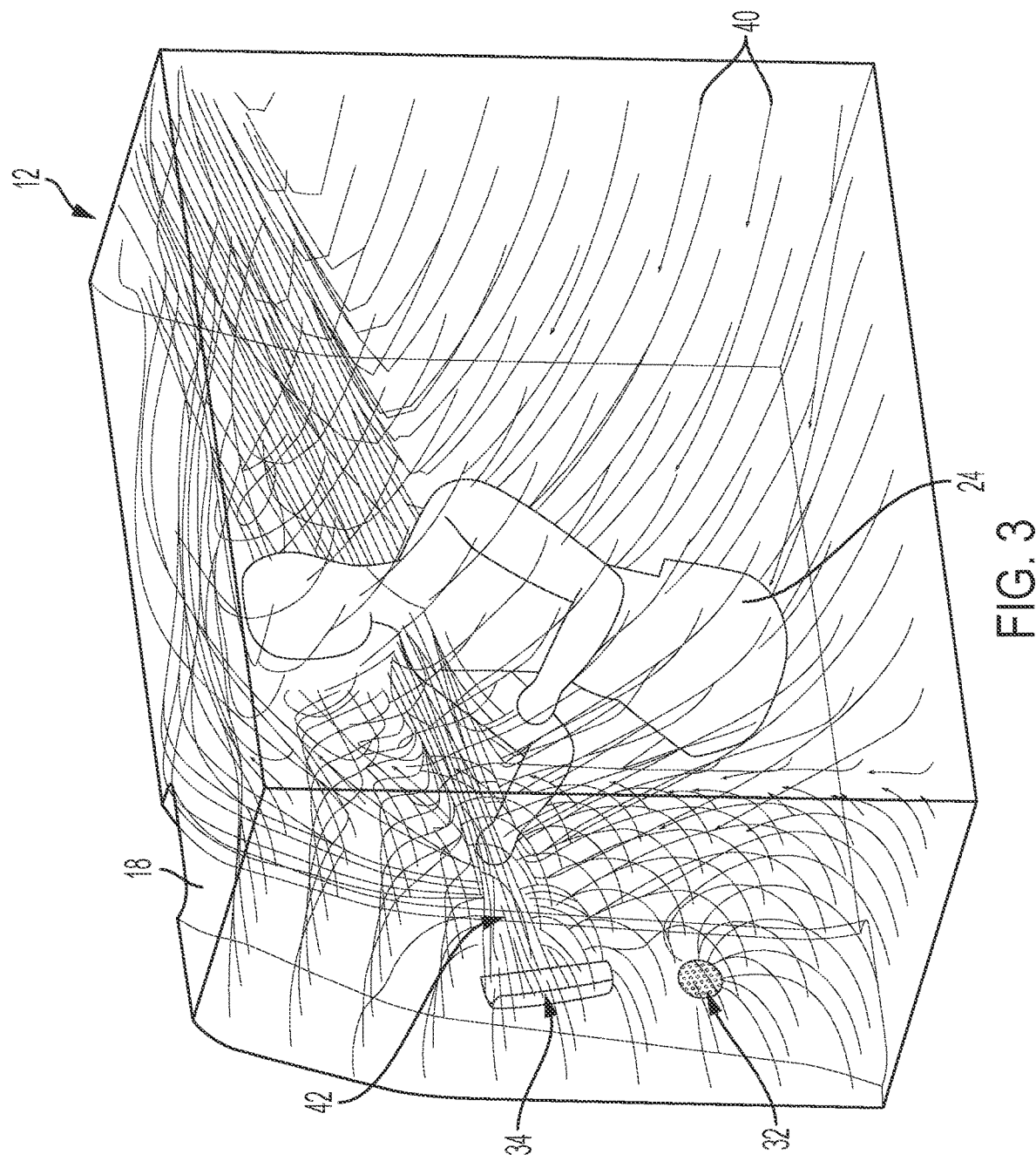
FIG. 3 illustrates an air-flow diagram with lines showing air flow within the vehicle's cabin utilizing the air circulation system described herein, according to an embodiment.

FIG. 3 illustrates the air flow within the cabin 12 when the air circulation system 30 is in use. Arrows 40 represent the air flow within the cabin 12. As illustrated by the arrows 40, some of the cabin air enters the inlet 32 of the air circulation system 30. A fan (described further below) within the air circulation system 30 forces the air out of the outlet 34. The fan within the air circulation system 30 forms a high-velocity air stream 42, also referred to herein as a blade of forced air. The air circulation system 30 may have louvers, blades, doors, or the like that direct the air stream to a desired location. Here, the air circulation system 30 is directing the air stream 42 to the head region of an occupant 24 seated in the second row of seats in the vehicle.

As explained above, the outlet 34 may include one or more narrow slots. This enables the outlet 34 to create a Coandă effect in which the air stream 42 pulls additional surrounding air in the direction of the stream. Air from the front of the cabin 12 is pulled or otherwise forced from the front of the cabin 12 toward a rear of the cabin 12 due to the Coandă effect. Moreover, the high-velocity output from the fan of the air circulation system 30 creates a low pressure area near the outlet 34 via the Venturi effect, which further draws air from the front of the cabin 12 toward the direction of the outlet 34; the stream 42 then forces the drawn air rearward within the cabin 12. This results in air in the cabin (and not just air expelled from the outlet 42) to be sent in the direction of the passenger 24.

Figure 4B:
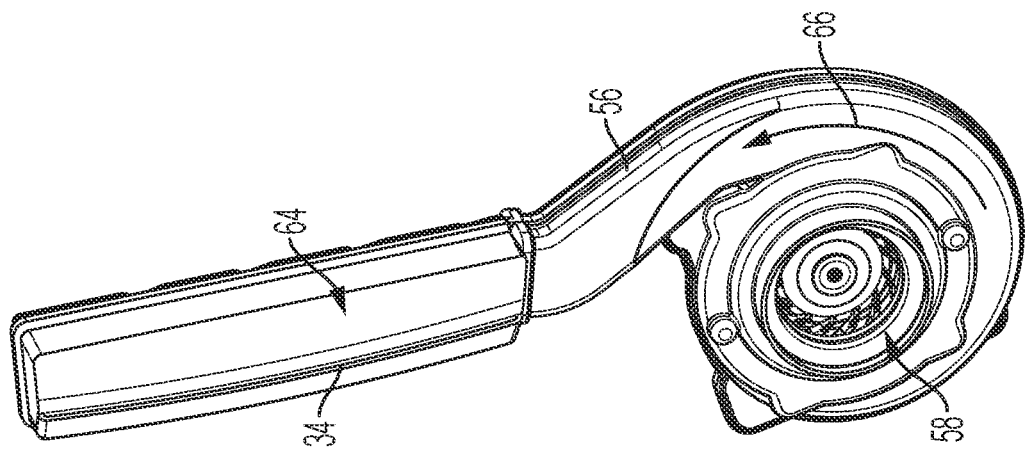
FIG. 4B illustrates a front perspective view of an interior of a portion of the air circulation system, according to an embodiment.
Figure 4A:
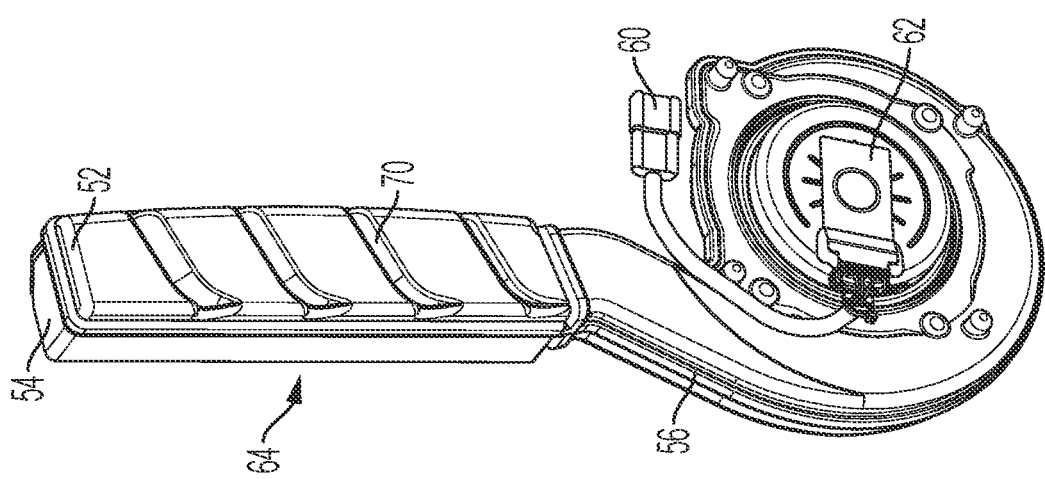
FIG. 4A illustrates a rear perspective view an exterior side of the air circulation system.

FIG. 4A illustrates one embodiment of the air circulation system 30 in isolation. The air circulation system 30 may include two shells that can be assembled together (e.g., welded, fasteners, etc.) to create the hollow channels therein. For example, the air circulation system 30 may have a rear shell 52 and a front shell 54 that, when assembled, form a housing or scroll 56. Alternatively, the air circulation system 30 may have a single-piece housing that defines air channels therein. When the air circulation system 30 is assembled within the B-pillar, the air circulation system 30 is oriented such that the rear shell 52 has its outer surface facing away from the vehicle cabin (e.g., toward the exterior of the vehicle), while the front shell 52 faces toward the vehicle cabin (e.g., away from the exterior of the vehicle).

FIG. 4B shows one embodiment of an interior of the air circulation system 30. This is a cross-sectional view of the air circulation system 30 showing some of the inner components and the interior of the scroll 56 which directs the forced air.

Referring to FIGS. 4A-4B, the air circulation system 30 includes a fan 58. The fan 58 may be a circular fan that can be typically found in other parts of the vehicle, such as a seat ventilation system (SVS). In such an embodiment, the fan 58 is configured to rotate at high speeds (e.g., 4,000 revolutions per minute or greater) while producing low noise (e.g., less than 60 A-weight decibels, dBA). The fan 58 is electrically powered via a wired connection 60, and is controlled via a PCB 62. The PCB 62 may include a processor programmed to power the fan in response to user-controlled or automatic switch when air flow is desired. As illustrated, the PCB 62 may be aligned with openings in the front shell 52, which can allow the drawn air to pass over the PCB 62 to cool the PCB 62.

Operation of the fan 58 causes air to travel within the scroll 56 and upward into a throat 64, as indicated by arrow 66. The throat 64 can be defined as the generally-linear portion of the scroll 56 which runs along the outlet 34; the outlet 34 can be formed as part of the throat 64. The throat 64 of the air circulation system 30 provides an air chamber that facilitates the delivery of the forced air into the outlet 34. The outlet 34 then directs the forced air out of the air circulation system 30 and into the vehicle cabin 12 as described above.

The front shell 52 at the throat 64 may be provided with one or more air control grooves 70. The grooves 70 may be formed into the front shell 52, forming raised humps or impediments within the interior of the throat 64. These raised humps assist in evenly distributing the forced air throughout the throat such that the forced air exits the outlet 34 evenly, rather than at one concentrated location (e.g., the top). For example, as the air is forced into the throat 64, the raised humps impedes the air flow and redirects some of the air flow laterally to exit the outlet 34 rather than flowing directly to the top of the throat 64.

As shown in FIG. 4A, the grooves 70 may be formed such that the grooves closer to the top of the throat 64 are larger in size than the grooves closer to the bottom of the throat 64. In other words, as air flows upward along the throat 64, it reaches impediments of increasing size. This aids in the even distribution of air flow to the outlet 34.

Figure 5:
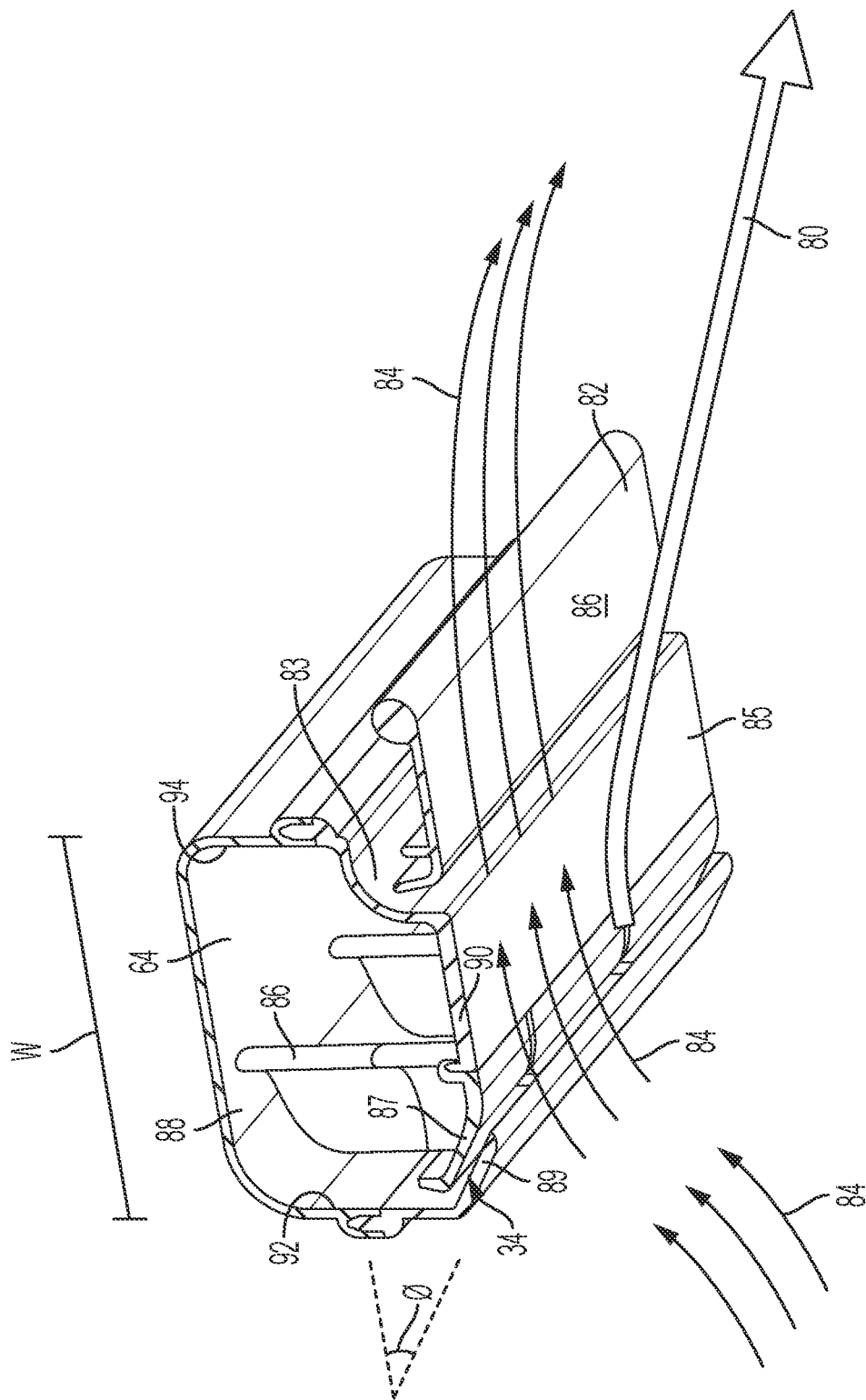
FIG. 5 illustrates a cross-sectional perspective view of a portion of a throat of the air circulation system, with lines illustrating air flow, according to an embodiment.

FIG. 5 illustrates a cross-sectional view of the throat 64 of the air circulation system 30. As can be seen, the interior of the throat 64 is a fluid channel for delivering the forced air to the outlet 34. The interior of the throat 64 may be defined by a single sheet of metal (e.g., aluminum) bent to shape to form the outer perimeter of the throat 64. The outlet 34 may be a gap between two portions of the bent sheet. This may resemble a narrow slot or slit in the throat 64 so as to create the low pressure point along the length of the outlet 34. The air expelled from the outlet 34 may follow the airflow line 80.

The air circulation system 30 may also include a deflector 82. The deflector 82 may be separately attached to the throat 64, and may be pivotally connected thereto. The throat 64 may have an outer surface with a concave region 83 running along the length of the throat 64, and the deflector 82 may be attached within this concave region 83. Pivoting of the deflector 82 relative to the throat 64 (or outlet 34) allows an occupant to direct the airflow exiting the outlet. In other words, pivoting of the deflector 82 can change the air flow direction 80. In some embodiments, the deflector 82 is pivotally attached directly to an outer surface of the throat 64 by, for example, a hinge, living hinge, fastener, or the like. In other embodiments, the deflector 82 is pivotally attached to the outer surface of the throat 64 indirectly.

The deflector 82 can be freely adjusted by a user for desired air flow targeting. In other words, the user can manually adjust the deflector 82 to direct the air flow accordingly. In another embodiment, the deflector 82 can be automatically controlled to adjust the air flow direction. In such an example, an actuator motor (not shown) can be utilized to control the location of the deflector 82 relative to the throat 64. The actuator motor may be located in the B-pillar, adjacent to the housing of the air circulation system 30, or may be within the housing itself. Also, the deflector 82 (as well as activation of the fan and air circulation system 30 itself) can be controlled by-wire from either a front or rear passenger with a manual switch, or can automatically be controlled by an electronic control unit (ECU) associate with the vehicle's air conditioning system.

FIG. 5 also shows additional airflow lines 84. These airflow lines represent the flow of air within the vehicle cabin 12. The outlet 34 creates a region of lower pressure, thus causing the air within the cabin 12 to be drawn toward the outlet 34. Moreover, due to the Coandă effect, the air flow 84 is attracted to the high pressure air flow exiting the outlet 34. Thus, referring back to FIG. 3, air that is in the vehicle cabin 12 (but is not traveling through the air circulation system 30) is nonetheless attracted to flow alongside or with the air stream 42 due at least in part to (a) the Venturi effect created with the low-pressure air exiting the outlet 34, and (b) the Coandă effect causing the air to be attracted to the air stream 42 exiting the outlet 34.

The outer surface of the throat 64 may also have a planar region 85 interposed between the outlet 34 and the concave region 83. The air from the vehicle cabin (as well as the air exiting the outlet 34) can travel along the planar region 85 (and attracted thereto by the Coandă effect), and onto the outer surface of the deflector 82. The deflector 82 thus inhibits at least some of the air flow from circulating around the outer surface of the throat 64 (e.g., the right side of the throat in the orientation shown in FIG. 5), and instead directs the air in the direction of air flow lines 84. As illustrated in FIG. 5, the deflector 82 may be oriented such that it has a planar surface 87 extending along its width that can be parallel to the planar region 85 of the throat.

FIG. 5 also illustrates an embodiment in which the outlet 34 is angled. For example, the outlet 34 may be formed by overlapping portions of the throat, such as surfaces 87 and 89. Surface 89 overlaps surface 87, and the outlet 34 is defined there between. The surfaces 87, 89 can be part of the continuous material that defines the perimeter of the throat 64. In the illustrated embodiment, both surface 87, 89 are parallel to one another and extend at an angle θ relative to a direction of the width w of the throat. The angle θ may be between 25 and 50 degrees. In another embodiment, the angle θ is between 30 and 40 degrees. In another embodiment, the angle θ is 32 degrees. This angle can maximize the air flow magnification and pressure loss for more efficient air flow within the vehicle cabin.

To facilitate airflow within the throat 64 of the air circulation system 30, the throat 64 may be provided with one or more veins 86. The veins 86 are configured to make the flow more uniform (e.g., homogenize the air flow) in the throat 64 before exiting through the outlet 34. According to one embodiment, the veins 86 are walls or partitions that may extend from one side and partially toward another side of the interior of the throat 64 (e.g., in the view shown in FIG. 5, the veins 86 can extend from the top inner surface 88 of the throat 64, and partially toward the bottom inner surface 90 of the throat 64 without contacting the bottom inner surface 90). Thus, the veins 86 may extend from a surface opposite the outlet 34. The veins 86 may also be curved in a direction toward the outlet 34. For example, the veins 86 may each begin in a central region within the throat 64 (e.g., between a left inner surface 92 and a right inner surface 94 of the throat 64 in the orientation shown in FIG. 5), and may terminate at (or closer to) the left inner surface 92. The veins 86 may be oriented such that the point of termination of the vein 86 is located downstream of the starting point of the vein, as shown in FIG. 5.

Figure 6:
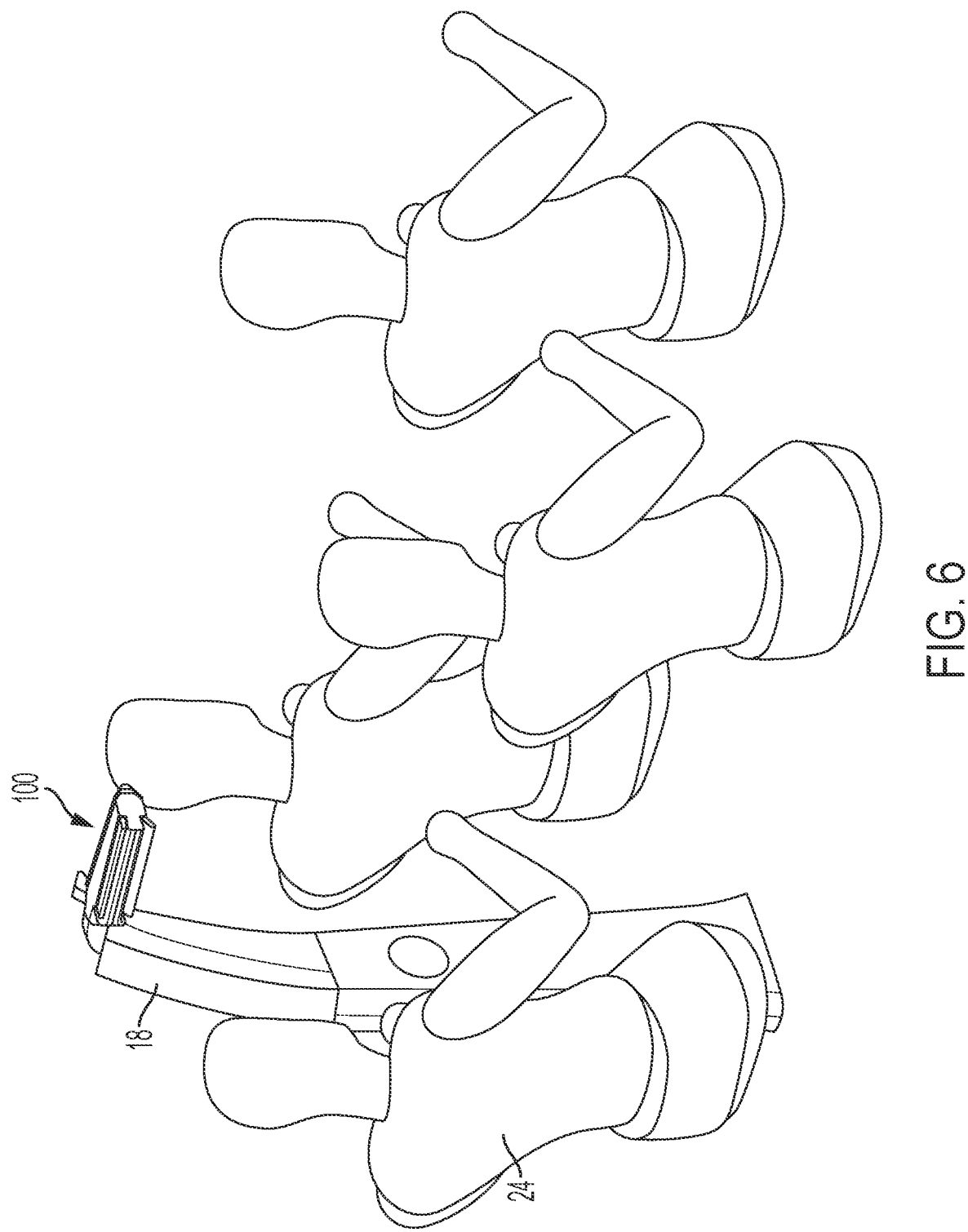
FIG. 6 shows an embodiment of the air circulation system incorporating a swing arm located above the passengers in the second row of seats.

FIG. 6 illustrates another embodiment of a fluid circulation system with a swing arm 100 attached thereto. Like the previous embodiments, the fluid circulation can be located within the B-pillar 18 of the vehicle so as to direct conditioned air to the rear passengers 24. The swing arm 100 can be an extension of the fluid circulation system, for example, can be coupled to the throat of the fluid circulation system. The swing arm 100 can be pivotally connected to the throat, or the B-pillar 18 such that the passenger 24 can pivot the swing arm 100 toward the side of the vehicle (e.g., similar to a sun visor) when desired.

Figure 7:
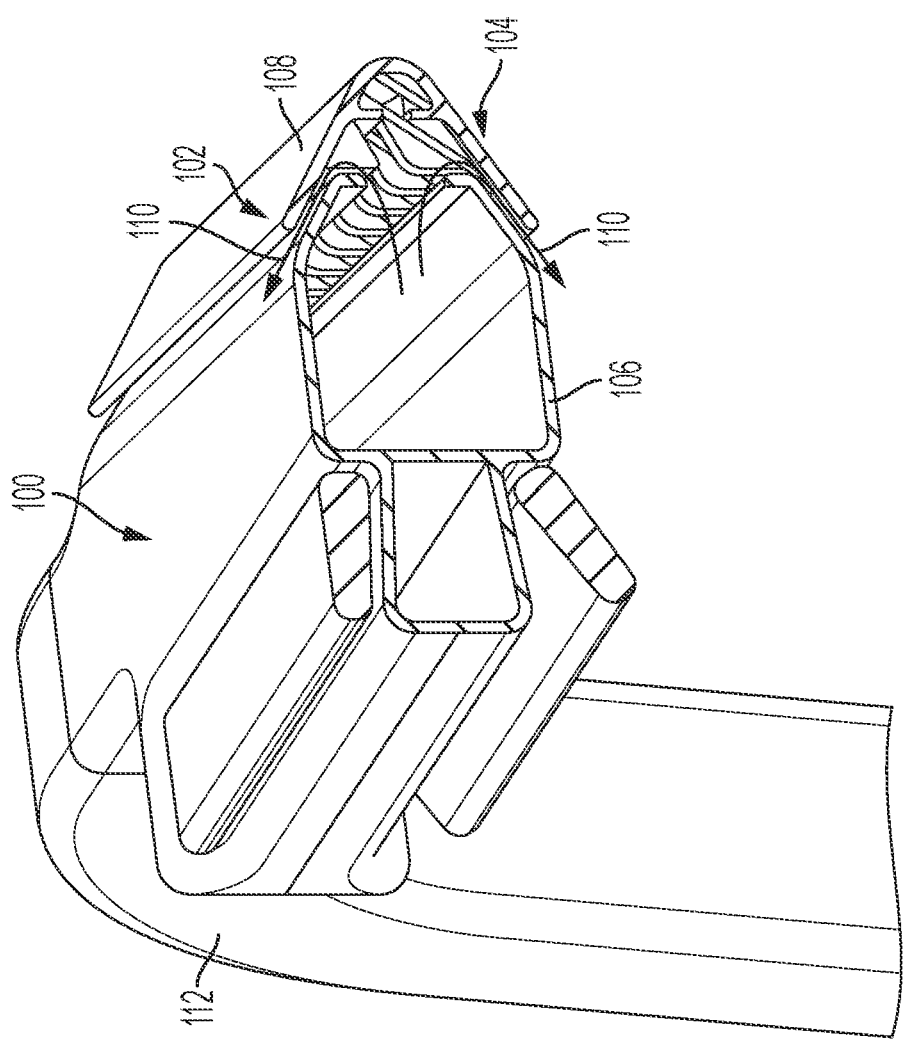
FIG. 7 shows a perspective cross-sectional view of a portion of the air circulation system of FIG. 6, according to an embodiment.

FIG. 7 shows a cross-sectional view of the swing arm 100, according to an embodiment. The swing arm 100 may have two outlets, namely a first outlet 102 and a second outlet 104. The outlets 102, 104 are defined between a tube 106 and a cap 108 placed over the tube 106. The cap 108 is oriented such that it directs the air flow rearward (e.g., in the direction of arrows 110). The tube 106 may be fluidly connected to another tube 112 that extends downward (e.g., into the B-pillar 18) that receives forced air from the fan of the air circulation system 30 (not shown).

While embodiments described herein relate to the air circulation system being installed in the B-pillar, it should be understood that the air circulation system 30 is not limited to being installed only in that location. For example, the disclosed air circulation system can be installed in the C-pillar to improve the quality of air flow to a third row of seating. In other embodiments, the air circulation system can be installed in a vehicle roof rail, a back of a seat in the first row, the back of a seat in the second row, within a door panel, including several locations within a door panel so as to direct air to an associated window. Modifications to the design, size, and appearance of the air circulation system can be made accordingly.

Additionally, the air circulation system disclosed herein is not limited to having a single inlet and/or a single outlet. For example, one fan or blower can supply air to more than one outlet, and multiple fans or blowers can supply air to a single outlet.

The air circulation system disclosed herein can also include or accommodate a heat exchanger and/or associated pipe for cooling and/or heating functions, i.e., cooling or heating the air circulated within the air circulation system 30. The air circulation system may include an electric heater, thermoelectric cooling device, and/or air purification including at least one of a filter, ultra-violet (UV) based purification system, chemical-based photocatalysis, or a standalone air filtration. Additionally, the air circulation system 30 can include an air refresher or fragrance diffuser to further treat the air circulated therein. The air circulation system 30 can also accommodate a sensing device for air quality, odor, temperature, and/or allergens.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An air circulation system configured to mount within a B-pillar of a vehicle, the air circulation system comprising:
    a scroll within the B-pillar, the scroll defining an inlet configured to receive inlet air from a vehicle cabin at the B-pillar;
    a fan within the B-pillar and configured to circulate the inlet air within the scroll;
    an elongated throat extending from the scroll and configured to receive forced air from the scroll, wherein the throat defines a length and an outlet extending along the length, wherein the outlet is configured to deliver the forced air into the vehicle cabin from the B-pillar in an air stream; and
    a deflector pivotally attached to the throat, wherein pivoting of the deflector changes the direction of the air stream;
    wherein the outlet is configured such that the forced air delivered from the outlet creates a Coandă effect that attracts air in the vehicle cabin to move in the direction of the air stream; and
    wherein the throat defines an outer surface having a concave region extending along the length of the throat, and the deflector is pivotally attached to the throat within the concave region.

2. The air circulation system of claim 1, wherein the deflector defines a planar surface configured to extend parallel to a corresponding planar outer surface of the throat.

3. The air circulation system of claim 1, wherein the throat defines a plurality of interior surfaces defining an air channel for delivering the forced air, wherein the air circulation system further includes a plurality of veins extend inwardly from one of the interior surfaces.

4. The air circulation system of claim 3, wherein each vein intersects only a single one of the interior surfaces such that the veins extend only partially into the air channel.

5. The air circulation system of claim 3, wherein the veins are curved so as to direct the forced air into the outlet.

6. The air circulation system of claim 1, wherein the outlet is defined between a first surface of the throat and a second surface of the throat that overlaps the first surface of the throat.

7. The air circulation system of claim 6, wherein the first surface and second surface extend at an angle relative to a width of the throat, wherein the angle is between 25 and 50 degrees.

8. The air circulation system of claim 7, wherein the angle is between 30 and 40 degrees.

9. An air circulation system for a vehicle, comprising:
a scroll having an inlet that receives air from a pillar of a vehicle;
a fan within the scroll and configured to circulate the air within the scroll;
an elongated throat extending from the scroll and configured to receive the air via the fan, wherein the throat defines a length and an outlet extending along the length, wherein the outlet is configured to deliver forced air from the throat to a cabin of the vehicle at the pillar in an air stream, wherein the throat defines a plurality of interior surfaces defining an air channel for delivering the forced air to the cabin;
a plurality of veins extending inwardly from one of the interior surfaces, wherein the veins are configured to homogenize the air flow in the air channel; and
a deflector pivotally attached directly to the throat, wherein pivoting of the deflector changes the direction of the air stream
wherein the outlet is configured such that the forced air delivered from the outlet creates a Coandă effect that attracts air in the cabin of the vehicle to move in the direction of the air stream; and
wherein the throat defines an outer surface having a concave region extending along the length of the throat, and the deflector is pivotally attached to the throat within the concave region.

10. The air circulation system of claim 9, wherein each vein intersects only a single one of the interior surfaces such that the veins extend only partially into the air channel.

11. The air circulation system of claim 9, wherein the veins are curved in a direction so as to direct the forced air into the outlet.

12. The air circulation system of claim 9, wherein the outlet is defined between a first surface of the throat and a second surface of the throat that overlaps the first surface of the throat.

13. The air circulation system of claim 12, wherein the first surface and second surface extend at an angle relative to a width of the throat, wherein the angle is between 25 and 50 degrees.

14. The air circulation system of claim 13, wherein the angle is between 30 and 40 degrees.

* * * * *